Figure 1:
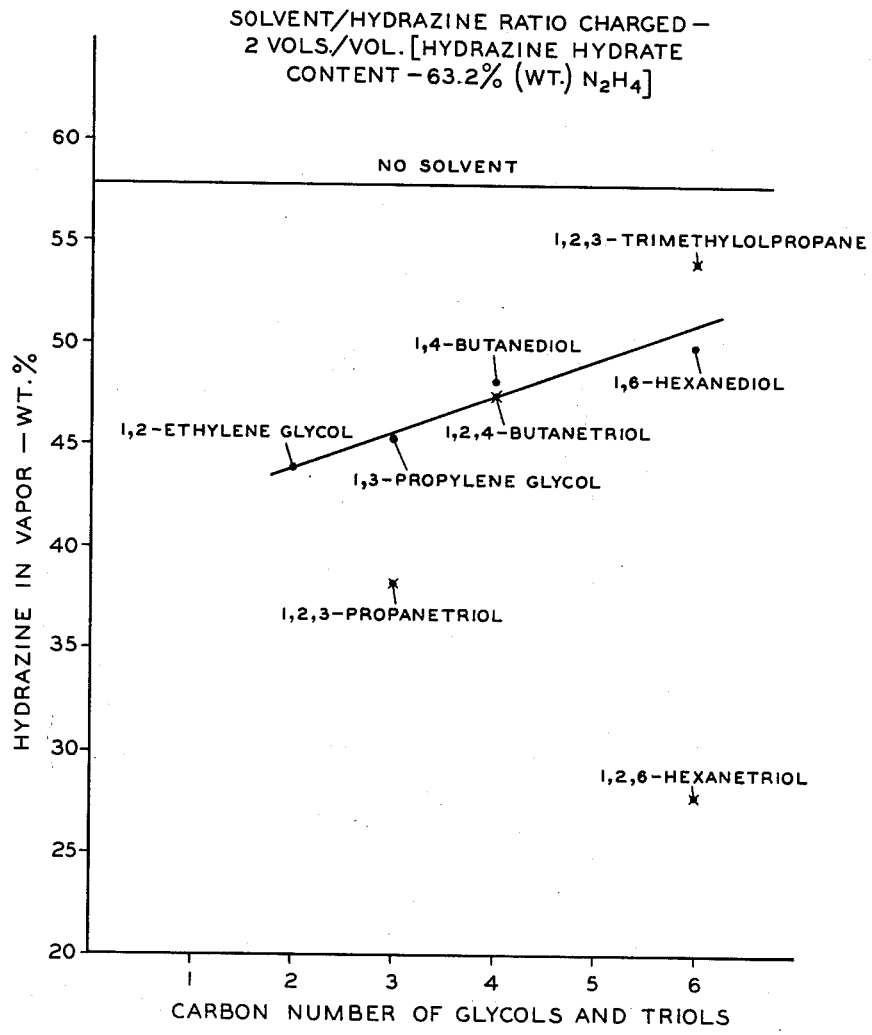

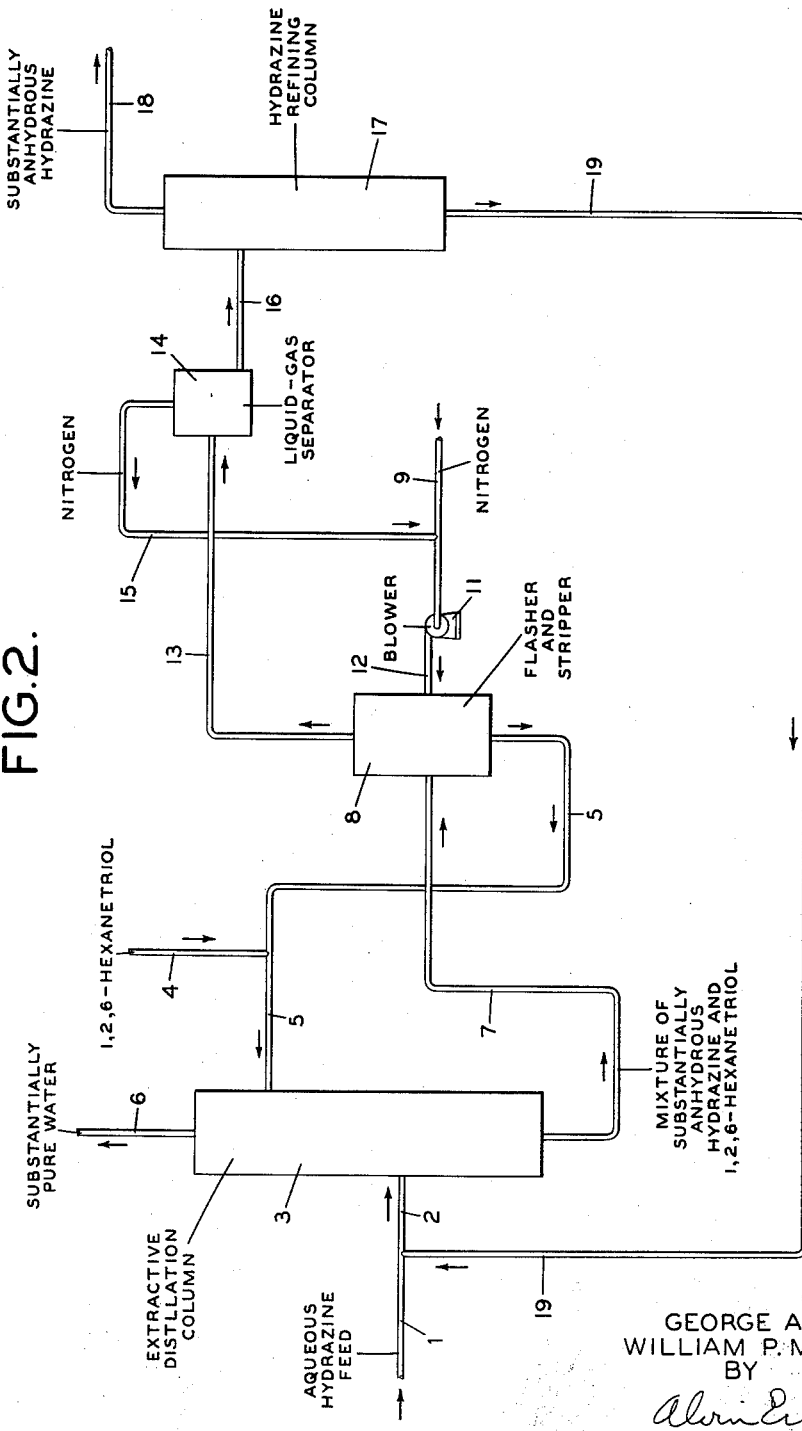

United States Patent Office 3,133,870
Patented May 19, 1964

3,133,870
EXTRACTIVE DISTILLATION OF HYDRAZINE WITH 1,2,6-HEXANETRIOL
George A. Elliott, Petersburg, and William P. Moore, Jr., Chester, Va., assignors to Allied Chemical Corporation, New York, N.Y., a corporation of New York
Filed Nov. 16, 1961, Ser. No. 152,894
3 Claims. (Cl. 202—39.5)

This invention relates to hydrazine and more particularly refers to a new and improved process for the production of substantially anhydrous hydrazine from dilute aqueous hydrazine solutions.

Hydrazine produced by conventional synthesis is obtained as a dilute aqueous solution, about 1-3, by distillation of the reaction mixture. Simple distillation of dilute aqueous hydrazine gives an azeotropic composition containing approximately 71% of hydrazine. Further distillation at atmospheric pressure does not serve to increase the concentration of hydrazine. In one proposed method for obtaining anhydrous hydrazine, hydrazine hydrate is subjected to multiple distillation from caustic soda or other alkalies. In another method, the base may be absorbed in acid the salt separated from water and ammonolyzed to obtain anhydrous hydrazine in liquid ammonia. These processes are not only complicated but are expensive and appreciable hydrazine loss occurs by decomposition over extended periods. More recently another method was suggested, U.S. Patent 2,678,298, for producing anhydrous hydrazine by extractive distillation in the presence of a glycol, such as ethylene glycol, as a solvent. While this constitutes an improvement over the prior art methods of preparing anhydrous hydrazine, unfortunately the glycols as an extractive solvent were found to be relatively inefficient, more specifically in that hydrazine was carried over as vapor when water is distilled from the hydrazine and large towers had to be provided with consequent appreciable increase in capital investment and operating cost.

An object of the present invention is to provide an efficient economical process for producing substantially anhydrous hydrazine from dilute aqueous hydrazine solutions. Other objects and advantages will be apparent from the following description and accompanying drawings.

In the course of extensive experimentation we tried many compounds including the glycols of Patent 2,678,298, to determine their utility as an extractive solvent for producing anhydrous hydrazine but found that these compounds had an efficiency of about the same magnitude i.e. no material improvement over the prior art. However, in the course of our work we noted that one compound namely 1,2,6-hexanetriol, which incidentally is different from and not a glycol, behaved in an unexpected and surprising manner from the other compounds in that extractive distillation of aqueous solutions of hydrazine could be effected in equipment of about one-quarter the size of that required in using a glycol without carry over of hydrazine, less than 0.01% hydrazine, when distilling water from the dilute aqueous hydrazine solution. In an attempt to reconcile the unusual behavior of the 1,2,6-hexanetriol, comparative tests were made not only with glycols but with other triols and it was found that 1,2,6-hexanetriol was outstanding.

FIGURE 1 presents distillation data on hydrazine with various glycols and triols in the presence of water. In these tests it was considered desirable for the water to distill overhead with minimum hydrazine in the vapor. Obviously, in commercial practice it would be important for minimum hydrazine to be lost when water is distilled away from the hydrazine. The runs indicated on the drawing were made at equilibrium in a one-plate Othmer still, which is designed to condense and return the overhead to reach essentially equilibrium conditions. The ratio of solvent to hydrazine charged to the still was two volumes of solvent to one volume of hydrazine hydrate (the hydrazine hydrate contained 63.2 wt. percent hydrazine, the rest water). The tests indicate the relative efficiency of the various solvents for reducing the present hydrazine in the water-hydrazine vapor going overhead.

In FIGURE 1, glycols of several carbon numbers are plotted as dots. As indicated by the line through these dots, the hydrazine in the vapors increases with increasing molecular weight of the glycols. Triols are plotted as crosses; it will be seen that results with the triols are not predictable on the basis of molecular weight of the triol. The 1,2,6-hexanetriol is much more efficient than the other triols in reducing hydrazine in the vapor, and it is also more efficient than any glycol tested.

The process of the present invention may be simply and conveniently carried out by feeding aqueous hydrazine charge into a conventional extractive fractionating column, introducing the extractant, 1,2,6-hexanetriol, into the column above the feed point of the aqueous hydrazine, distilling and removing from the top of the column as vapor substantially pure water, withdrawing as bottoms from the column a mixture of substantially anhydrous hydrazine and 1,2,6-hexanetriol, and separating substantially anhydrous hydrazine from the bottoms withdrawn from the column.

FIGURE 2 diagrammatically illustrates one method of carrying out the present invention.

Referring to FIGURE 2 of the drawing, the charge to the process entering through line 1 is an aqueous solution of hydrazine preferably containing about 50–75% weight of hydrazine, although more dilute aqueous hydrazine as low as about 30%, and more concentrated hydrazine solution of 80 or more percent may be employed. The preferred charge stock is hydrazine hydrate or a composition approximating that concentration obtained usually by the atmospheric fractionation of more dilute aqueous hydrazine. The azeotropic mixture obtained by distillation of hydrazine and water at atmospheric pressure contains 71.5% hydrazine. The aqueous hydrazine feed is continuously fed through lines 1 and 2 into extractive distillation column 3 which may be any suitable type of fractionating column such as a standard tray or packed column provided with a conventional reboiler section. 1,2,6-hexanetriol entering through line 4 then through line 5 is introduced near the top of extractive distillation column 3 at a point above the entrance of aqueous hydrazine feed entering through line 2. The column is operated under extractive distillation conditions of elevated temperature and in the presence of 1,2,6-hexanetriol solvent to establish separation as vapor of substantially pure water from bottoms comprising hydrazine and 1,2,6-hexanetriol substantially free of water. Column 3 may be operated under superatmospheric pressure or subatmospheric pressure but preferably is operated under substantially atmospheric pressure or slight superatmospheric pressure of about 1–5 p.s.i.c. with of course, temperature correlated with the pressure, higher temperatures being employed with higher pressures as is known. Generally the column head temperature will be about 90–110° and the column reboiler temperature or temperature in the bottom of the column will be within the range of 140–175° C. The 1,2,6-hexanetriol/hydrazine hydrate feed ratio may vary from 0.3 to 3.0 mols/mol but preferably within the range of 1.0 to 1.5 mols per mol. Under extractive distillation conditions in column 3, substantially pure water is released from the top of column 3 and discharged through line 6. The bottoms in extractive distillation column 3 comprise principally 1,2,6-hexanetriol and hydrazine, the latter constituting generally about 15–

50 percent by weight, together with a minor proportion of water and are withdrawn from the bottom of column 3 or the column reboiler and directed through line 7 to flasher and stripper 8 which may take the form of a tubular heat exchanger wherein the bottoms are contacted with an inert gas to remove hydrazine from the bottoms. For convenience flasher and stripper 8 is operated at about atmospheric pressure although higher or lower pressures may be employed, and a corresponding temperature generally about 180–220° C. to effect vaporization of the hydrazine. The stripped bottoms consisting primarily of 1,2,6-hexanetriol is withdrawn from the stripper 8 through line 5 and returned to the top of extractive distillation column 3. Once the process is in operation it is unnecessary to add any additional 1,2,6-hexanetriol except for the usual minor losses which can be compensated for by the addition of make-up 1,2,6-hexanetriol through line 4. To aid in stripping the hydrazine from the bottoms in flasher and stripper 8, an inert gas such as nitrogen or helium or any other gas non-reactive with hydrazine or water is introduced through line 9 and forced by blower 11 through line 12 into flasher and stripper 8 in direct and intimate contact with the bottoms therewith.

From the top of flasher and stripper 8 is released a mixture of nitrogen gas, hydrazine vapor and a minor amount of water vapor which pass through line 13 into liquid-gas separator 14 which may be any suitable enclosed vessel equipped for cooling the gas and vapors, such as a cooling coil through which a cooling medium such as water passes in indirect heat exchange with the gas and vapor, to effect condensation of the hydrazine. Uncondensed nitrogen is released from liquid-gas separator 14 through line 15 and returned to the inlet blower 11 for introduction in contact with the bottoms in flasher and stripper 8.

Liquid condensate consisting principally of hydrazine and a small amount of water flows from liquid-gas separator 14 through line 16 into hydrazine refining column 17 which may be any conventional fractionating tower operated desirably at about atmospheric pressure and at a temperature of about 112–115° C. to effect vaporization of substantially anhydrous hydrazine. The anhydrous hydrazine is removed as vapor from the top of column 17 through line 18 and recovered as the product of the process. Bottoms from column 17 consisting of a mixture of water and hydrazine are discharged through line 19 and returned through line 2 into extractive distillation column 3 for further recovery of the hydrazine.

The following examples illustrate the present invention.

*Example 1*

In this example two runs were made, one with 1,2,6-hexanetriol and the other a comparative run with ethylene glycol.

A glass distillation column 1″ I.D. was packed with 36″ of ⅛″ glass helices and set up to operate continuously. Hydrazine hydrate (62.1% $N_2H_4$) was fed through a side arm on the column, located 12″ (approximately three theoretical plates) from the bottom of the packed section. Standard laboratory still head and take-off devices were provided for the column to remove water as the distillate, and continuous removal of still bottoms was provided through a side arm attached to the column reboiler. Arrangements were made to continuously pump the extraction solvent to the column through a side arm attached to the column 4″ (1 theoretical plate) from the top of the packed section. The packed section between the solvent feed point and the hydrazine hydrate feed point was 20″. The column operated at atmospheric pressure, 5/1 reflux ratio and 2 volumes of solvent per volume hydrazine hydrate.

When 1,2,6-hexanetriol was used as solvent, the water distilled from the hydrazine contained only 0.01% hydrazine in only 5 theoretical plates of extraction section. This gave a hydrazine recovery, in 1,2,6-hexanetriol solution from aqueous hydrazine hydrate in excess of 99.9%.

Ethylene glycol as solvent gave a water distillate containing 1.1% hydrazine from the 5th plate above the feed point. The superiority of the 1,2,6-hexanetriol over this previously reported hydrazine extraction solvent was further demonstrated by multiple distillation of the aqueous distillate in the same column until the distillate discharged contained only 0.01% hydrazine. A total of 20 plates extraction section were required to accomplish this with the ethylene glycol while 5 plates were sufficient with the 1,2,6-hexanetriol.

*Example 2*

A feed having the following composition in percent by weight: hydrazine 65.1, water 34.9 was pumped continuously, through a preheater, to the middle of the extractive distillation column at a rate of 256.4 grams per hour. Hexanetriol was fed, through a preheater, to the top of the extractive distillation column, a column 1.65 inches in diameter, 2 feet long and packed with ⅛ inch glass helices. (Approximately 5 theoretical plates). The hexanetriol, charged at the rate 652.4 grams per hour, contained 93.50% (wt.) hexanetriol and 6.50% (wt.) hydrazine in continuous operation, the hydrazine resulting from residual hydrazine in the stripper bottoms. Distillate, substantially pure water, was taken overhead at 100 to 103° C. and atmospheric pressure. The bottom reboiler was maintained at 155–165° C. Bottoms from the extractive distillation column, continuously withdrawn at a rate of 850.7 grams per hour, had a composition in percent by weight: hydrazine 24.5, water 3.8, hexanetriol 71.7.

Extractive distillation bottoms entered the top of the hexanetriol flasher-stripper, a straight tube heat exchanger fitted with baffles to give intimate gas-liquid contact and having a disengaging space at the top. Stripper gas (nitrogen) entered the bottom of the flasher-stripper and flowed countercurrent to the descending liquid. Temperature of the flasher-stripper was controlled at about 200° C. Bottoms from the flasher-stripper, recycled to the extractant feed tank at 652.4 grams per hour, comprised in percent by weight: hydrazine, 6.5; hexanetriol, 93.5. Nitrogen stripper gas was charged at a rate of 36.0 liters per hour. Vapors from the flasher-stripper contained 68.2 wt. percent hydrazine, 13.3 wt. percent water, and 18.5 wt. percent nitrogen. The vapors were cooled by heat exchanger and condensate separated in the liquid-gas separator. Uncondensed gas (36 liters per hour) was recycled, through a blower to the flasher-stripper bottom. Condensate, continuously removed from the liquid-gas separator at rate of 198.3 grams per hour, comprised in percent by weight: water 16.3, hydrazine 83.7.

A 793 gram portion of condensate from the liquid-gas separator, containing in percent by weight: hydrazine 83.7, water 16.3, was charged to the kettle of a 1-inch fractionating column, 2 feet long, and packed with ⅛ inch glass helices. (Approximately 5 plates.) Distillation of the charge at atmospheric pressure and a reflux ratio of 15 reflux to 1 take-off yielded 394 grams distillate at 113.5°–114° C. having a composition in percent by weight: hydrazine 98.8, water 1.2. The bottoms, 399 grams, had a composition in percent by weight: hydrazine 68.7, water 31.3. Bottoms from the final distillation column were recycled to the extractive distillation column.

Although certain preferred embodiments of the invention have been disclosed for purpose of illustration, it will be evident that various changes and modifications may be made therein without departing from the scope and spirit of the invention.

We claim:
1. In a process for the separation of water from aqueous hydrazine by subjecting the aqueous hydrazine to extractive distillation with a solvent under extractive distillation conditions to vaporize and remove substantially pure water, the improvement which comprises effecting the extractive distillation with 1,2,6-hexanetriol solvent.

2. A process as claimed in claim 1 in which the liquid fraction remaining after removal of water by extractive distillation is subjected to stripping to vaporize hydrazine from the 1,2,6-hexanetriol solvent contained in the liquid and the stripped liquid containing 1,2,6-hexanetriol returned for further extractive distillation.

3. A process as claimed in claim 2 in which the hydrazine separated in stripping operation is subjected to fractional distillation to remove as overhead substantially anhydrous hydrazine and the bottoms from the fractionation are returned to the extractive distillation.

References Cited in the file of this patent

UNITED STATES PATENTS

| | | |
|---|---|---|
| 2,678,298 | Nicolaisen | May 11, 1954 |
| 2,834,754 | Hatch | May 13, 1958 |
| 2,865,714 | Robell et al. | Dec. 23, 1958 |
| 2,878,103 | Robell et al. | Mar. 17, 1959 |
| 2,889,256 | Campbell | June 2, 1959 |
| 2,900,309 | Valentine | Aug. 18, 1959 |